United States Patent
Pines et al.

(10) Patent No.: US 6,944,189 B2
(45) Date of Patent: Sep. 13, 2005

(54) SYSTEM AND METHOD FOR MEASURING SAMPLE ARRIVAL RATES ON AN ASYNCHRONOUS TRANSPORT NETWORK

(75) Inventors: Philip J. Pines, Palo Alto, CA (US); Steven Riley, Summerland, CA (US)

(73) Assignee: Verilink Corporation, Madison, AL (US)

( * ) Notice: Subject to any disclaimer, the term of this patent is extended or adjusted under 35 U.S.C. 154(b) by 894 days.

(21) Appl. No.: 09/943,781

(22) Filed: Aug. 30, 2001

(65) Prior Publication Data

US 2002/0078225 A1 Jun. 20, 2002

Related U.S. Application Data

(60) Provisional application No. 60/229,367, filed on Aug. 30, 2000.

(51) Int. Cl.[7] ................................................. H04J 3/06
(52) U.S. Cl. ...................... 370/503; 370/516; 375/356
(58) Field of Search .............................. 370/230–235, 370/395.1, 503, 516–519; 375/354–358

(56) References Cited

U.S. PATENT DOCUMENTS

| 4,543,524 A | 9/1985 | Bulley |
| 5,278,828 A | 1/1994 | Chao |
| 5,636,202 A | 6/1997 | Garney |
| 5,790,523 A | 8/1998 | Ritchie, Jr. et al. |
| 5,790,543 A * | 8/1998 | Cloutier ....................... 370/252 |
| 5,912,880 A * | 6/1999 | Bernstein ..................... 370/252 |
| 2002/0064150 A1 | 5/2002 | Pines et al. |

FOREIGN PATENT DOCUMENTS

| EP | 1 005 209 A2 | 5/2000 |
| WO | WO 98/47251 A2 | 10/1998 |

* cited by examiner

Primary Examiner—Frank Duong
(74) Attorney, Agent, or Firm—Carr & Ferrell LLP (57) ABSTRACT

A method of providing improved accuracy of the calculation of the long-term average arrival rate (AAR) of an ATM packet stream is disclosed. Using this method, accurate synchronization of a receiver clock to a network clock is achieved. The invention measures the variable time interval, T, required to complete the arrival of a known and fixed number of data packets, C. Using a predetermined and relatively large number of data packets, a time interval measurement is accurately measured to very precise values. Because the time interval measurement is triggered precisely by the arrival of the first data packet to the complete arrival of the last data packet in the session, there is no quantization error with respect to the first and last data packet. AAR is then calculated as $(C*S)/T$, where $S$ is the number of samples per data packet.

27 Claims, 7 Drawing Sheets

SYSTEM AND METHOD FOR MEASURING SAMPLE ARRIVAL RATES ON AN ASYNCHRONOUS TRANSPORT NETWORK

CROSS REFERENCE TO RELATED APPLICATION

This application claims the benefit of Provisional Patent Application, Ser. No. 60/229,367, filed Aug. 30, 2000, entitled "Improved Method Of Measuring Sample Arrival Rate For An Asynchronous Transport," which is incorporated herein by reference.

BACKGROUND OF THE INVENTION

1. Field of the Invention

The invention relates generally to the synchronization of data transmissions over Asynchronous Transfer Mode (ATM) networks, and specifically to a system and method for measuring long-term sample arrival rates in such networks.

2. Description of the Related Art

Standard analog faxes and modems are designed for use over analog telephone lines. However, these lines are expensive to use on a per-channel basis. Therefore, it is common in the industry to use Asynchronous Transfer Mode (ATM) based services for these transmissions, such as Symmetric Digital Subscriber Lines (SDSL), in order to minimize the per channel cost of communication. ATM based services utilize sophisticated modulation schemes to pack data onto copper telephone wires. As a result, a number of analog signals can be combined with digital data for transmission over a single existing copper telephone line.

Figure 1:
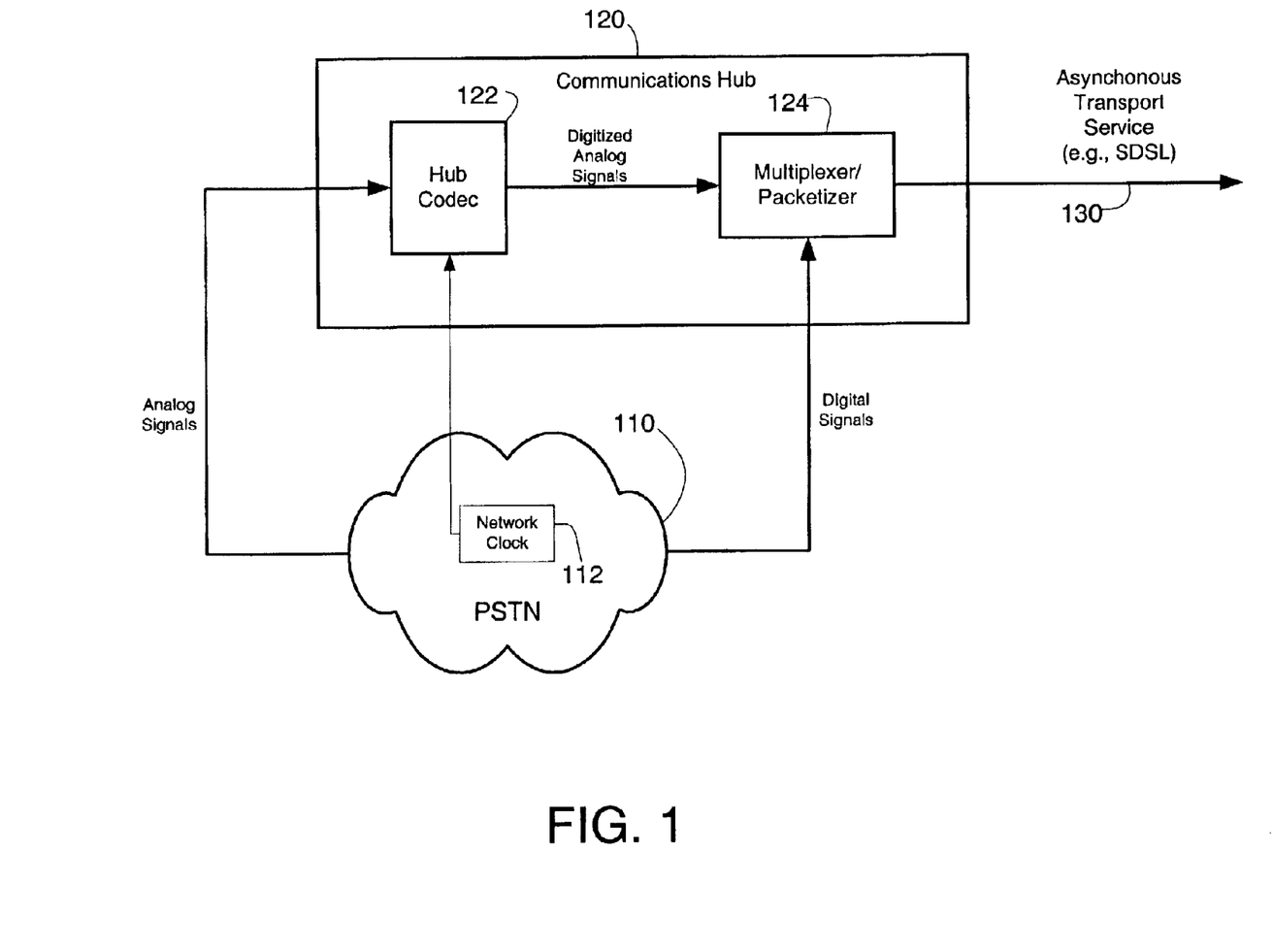
FIG. 1 is a schematic diagram illustrating an asynchronous transfer mode system.

FIG. 1 is a block diagram of a typical ATM network. Both digital and analog data may be transmitted by a synchronous network platform such as a Public Switched Telephone Network (PSTN) 110. The PSTN 110 includes a network clock 112. The PSTN 110 communicates with a communications hub 120. The communications hub 120 includes a hub codec 122 and a multiplexer/packetizer 124. Digital and analog data are sent from the PSTN 110 to the communications hub 120 where the analog signals are digitized by the hub codec 122. The rate of digitization, or sampling rate, is determined by the network clock 112. The digitized analog signals then pass through the multiplexer/packetizer 124, where the data is encapsulated into packets and sent over the network as a constant bit rate stream using an Asynchronous Transport Service 130, such as SDSL.

Figure 2:
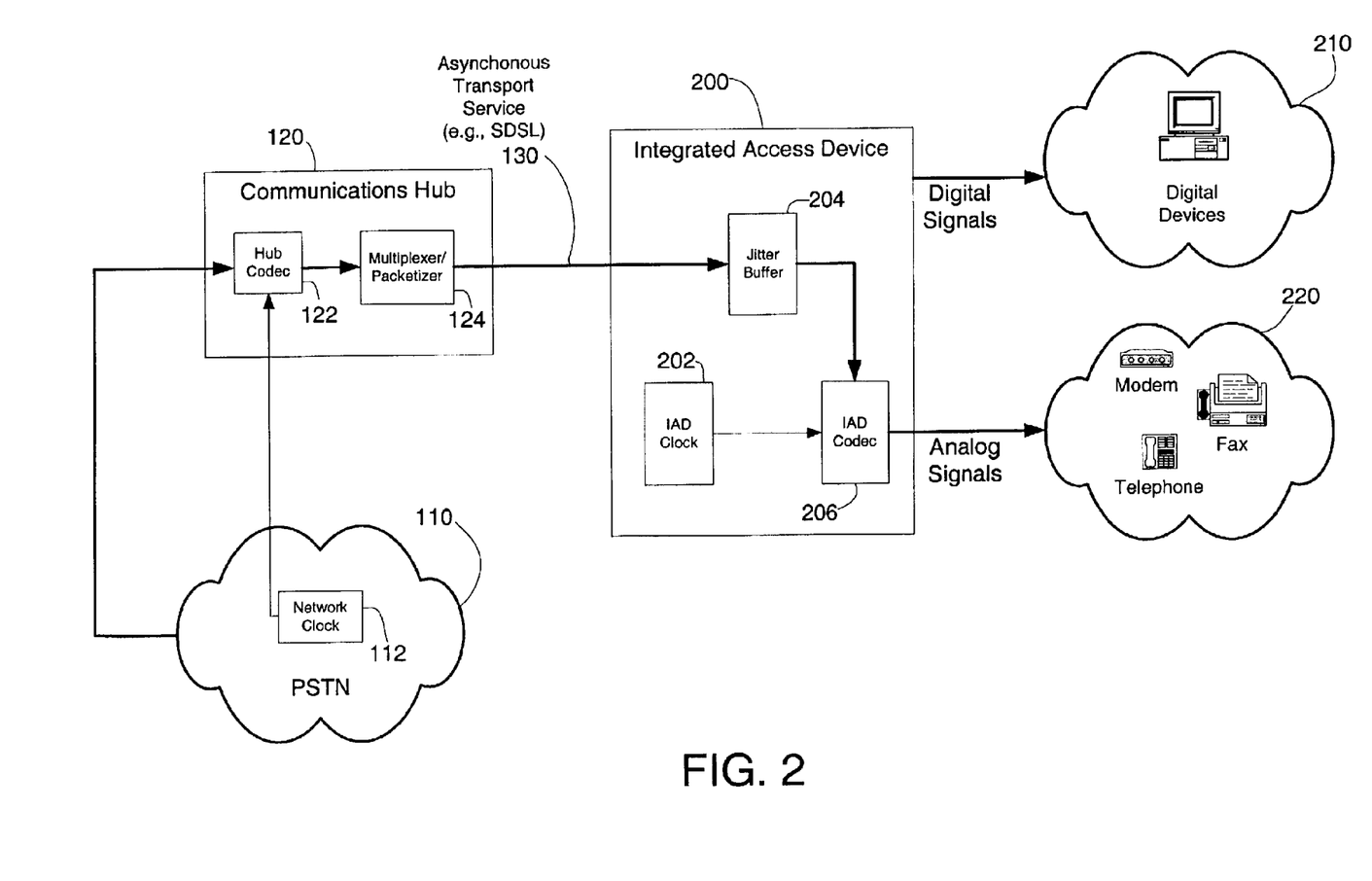
FIG. 2 is a schematic diagram of the asynchronous transfer mode system of FIG. 1 in conjunction with an Integrated Access Device (IAD) according to the present invention.

FIG. 2 is a block diagram of the receiving side of the ATM network. The data packets are sent over the asynchronous transport service 130 and are received by an Integrated Access Device (IAD) 200. The IAD 200 ultimately separates the digital data from the analog data and sends it on to end user services, such as digital devices 210 or analog devices 220. Examples of analog devices 220 are facsimiles, telephones or modems.

In order for the analog devices 220 to receive the data packets, the IAD 200 must first decode the digitized data. This is done by an IAD codec 206. The IAD codec 206 samples data at a rate determined by an IAD clock 202. Ideally, to achieve accurate and timely decoding, the IAD codec 206 must be made to decode the data at or near the same rate that the hub codec 122 samples the data. As discussed above with reference to FIG. 1, the network clock 112 of the PSTN 110 determines the transmit sampling rate of the hub codec 122. Therefore, in order to synchronize the sampling rate of the hub codec 122 with the sampling rate of the IAD codec 206, it is necessary to synchronize the network clock 112 with the IAD clock 202.

When the IAD codec 206 processes data at a sampling rate that is different from that of the hub codec 122, three problems can arise. First, if the data packets arrive at the IAD codec 206 faster than it can process them, incoming data packets can be lost. Second, if the data packets arrive at the IAD codec 206 slower than it processes them, then undesirable latency occurs in the data stream and the data stream will require "padding". That is, instead of sending real data packets to the analog devices 220, the IAD codec 206 sends out artificially created packets that are made up of duplicate bits, constant bits or random noise. Finally, for satisfactory performance of most analog fax and modem applications, the sampling rates of the network clock 112 and the IAD clock 202 must match to an accuracy of better than one part per million. The IAD clock 202 needs to provide this precise sampling clock rate recovery and matching even though the rate of the network clock 112 can vary due to the dynamic and unpredictable nature of the asynchronous transport channel. For example, an analog channel sampled at a clock rate of 8000 samples per second at the hub codec 122 would require the IAD codec 206 to match that sampling rate within an accuracy of better than +/−0.008 samples per second. Similarly, a sampling clock rate of 2.048 Megahertz at the hub codec 122 would require a matching clock rate at the IAD codec 206 with an accuracy of better than +/−2.048 Hertz.

Analog signals on ATM-based services are quite satisfactory for most ordinary telephone conversations and occasional glitches (such as data loss or padding) in transmissions over asynchronous services are subjectively unimportant for most voice transmissions. Conversely, however, analog faxes and modems are particularly sensitive to corrupt or lost data, which can cause significant errors.

The network clock 112 is generally very accurate, and therefore the communications hub 120 will transmit digitized data to the IAD 200 at a constant and stable rate. However, due to the nature of asynchronous data protocol and transmission line limitations, the data is not received at the IAD 200 in the same constant and stable rate that it is transmitted. Furthermore, most ATM-based services do not transport synchronization signals, time stamps or a system clock with the data. Thus, the IAD 200 has no information as to the sampling rate of the network clock 112 and cannot directly synchronize the IAD clock 202 accordingly. Thus, in order to successfully conduct long communication sessions for analog faxes or modems in ATM-based networks without direct synchronization methods, the sampling rate of the IAD clock 202 must be synchronized to the sampling rate of the network clock 112 in some other, indirect way.

One method of overcoming this problem is to load the data received by the IAD 200 into a jitter buffer 204 at the full transmit rate. The data can then be clocked out of the jitter buffer 204 by the IAD codec 206 at a predetermined sample rate set by the IAD clock 202. However, when using this method, two degradation problems arise.

First, any time the sampling rate of the IAD clock 202 is offset from the sampling rate of the network clock 112, data packets are going to arrive at the IAD codec 206 either too fast or too slow. When the IAD codec 206 processes data too slow, it causes the jitter buffer 204 to quickly fill up and overflow. Subsequent data packets thus arrive to early for processing by the IAD 200 and data is lost. On the other hand, when the IAD codec 206 processes data too fast, the jitter buffer 204 is quickly depleted. Subsequent data packets arrive too late for processing by the IAD 200. When this happens, the IAD 200 must pad the data stream, as described above.

Second, the use of an inappropriate synchronization method can cause the IAD clock 202 to completely slip out of synchronization with the network clock 112. This deficiency can lead to observable defects on analog end services, such as sound imperfections in acoustic services and visible imperfections in video services.

Therefore, when using this method, there is a limit to how long the jitter buffer 204 can span the differential between clock rates before running out of buffer space. The jitter buffer 204 is limited to a finite length and as such can only accommodate a small mismatch between the clock rates of the network clock 112 and the IAD clock 202. This method is therefore satisfactory only as long as the clocks are in fairly close synchronization so that the data is clocked out of the jitter buffer 204 at roughly the same rate that it is received from the communications hub 120.

A second method attempts to match the clock rate of the IAD clock 202 to the clock rate of the network clock 112 by observing and controlling the rate of accumulation of data packets within the jitter buffer 204 and using a dual-frequency IAD clock 202 to regulate the flow of packets in and out of the buffer to control the rate of accumulation. This method monitors the rate of change and depth of data in the jitter buffer 204 compared to some predetermined threshold. When the data packet accumulation within the jitter buffer 204 exceeds the predetermined threshold, the IAD codec 206 clocks out data from the jitter buffer 204 at the faster of two clock rates. When the data packet accumulation within the jitter buffer 204 drops below the predetermined threshold, the IAD codec 206 clocks data out from the jitter buffer 204 at the slower of two clock rates. This approach is intended to minimize both buffer overflow and underflow, which will cause data errors as described above.

The main problem with this method is that the dual clock frequencies must be chosen with an appropriate differential sufficient to cover the maximum latency period of the network. Also, by definition, the sampling rate of the IAD clock 202 will never be set exactly right; it constantly alternates between being too fast and too slow.

Finally, yet another method uses the same dual-frequency IAD clock 202 discussed above. However, instead of monitoring the level of the jitter buffer 204, this method observes the long-term average arrival rate (AAR) at which data packets arrive at the IAD 200 and subsequently switches between one of two clock rates accordingly. Using this method, the data packets arriving at the IAD 200 are counted over a predetermined time interval. The total number of packets that arrive during the time interval is divided by the time interval, and the AAR is calculated. Thus, $AAR=(S*n)/T$, where S is the number of samples per packet, n is the number of packets counted and T is the time interval. The resultant AAR is thus an estimated value in samples/second of the sample rate of the hub codec 122. The clock rate of the dual-frequency IAD clock 202 is compared to the AAR, and then adjusted to either the faster or the slower frequency, as appropriate. Although this method does not monitor the jitter buffer 204, the goal is to ideally keep the jitter buffer about half full on the average so it can absorb the temporary mismatches between the AAR and the clock rate of the IAD clock 202.

Figure 3:
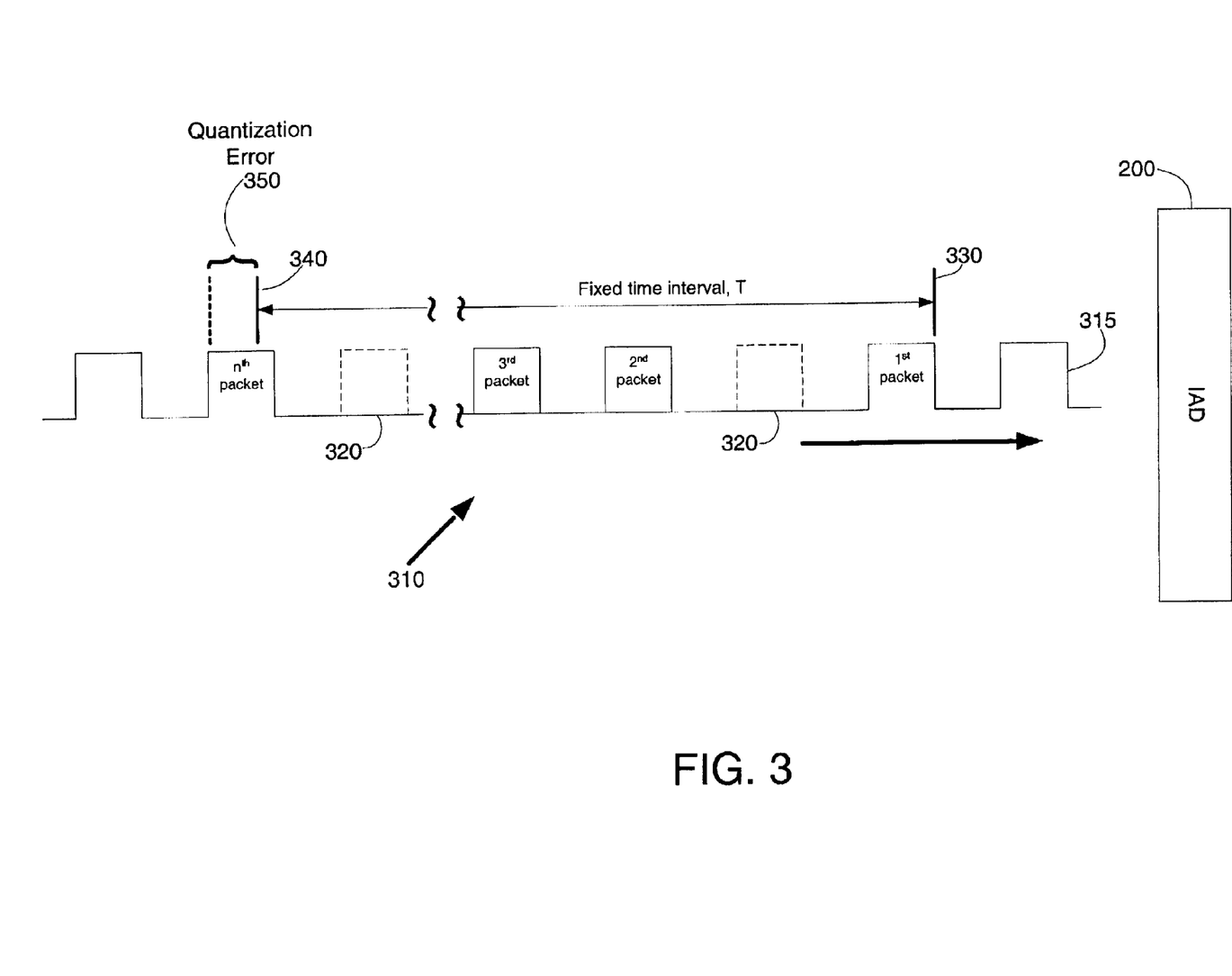
FIG. 3 is a diagram showing a pulse stream and associated quantization error in long-term average arrival rate calculations.

A problem with this method, however, is shown in FIG. 3. As described, data packets 315 of an ATM packet stream 310 arrive at the IAD 200 and are counted over a fixed time interval, T. The fixed time interval T begins at a start time 330 and ends at a stop time 340. Due to the nature of asynchronous data transmissions, the packets 315 do not arrive at the IAD 200 at a constant rate. Misplaced packets 320 are shown in dashed lines and represent packets that should have arrived at that instance in time.

As can be seen in FIG. 3, the start time 330 and the stop time 340 of the fixed time interval T are completely unsynchronized with the arrival of packets 315 in the ATM packet stream 310. If the start time 330 of the fixed time interval T slips out of synchronization with the arrival of the first data packet 315 of the ATM packet stream 310, the packet count is subject to a plus or minus one-packet error, depending on where the start time 330 occurs relative to the arrival of the first packet 315. Likewise, if the stop time 340 slips out of synchronization with the end of the arrival of the $n^{th}$ packet 315, a similar error occurs. As shown in FIG. 3, a quantization error 350 is introduced into the AAR calculation because the $n^{th}$ packet is counted as a whole data packet, when in fact the whole packet did not fall within time interval T. Conceptually, these errors can occur on both ends of the ATM packet stream 310, essentially doubling the error. Since there are S samples in each data packet 315, the total error in the sample count can be $+/-(2*S)$ samples.

Based on the foregoing, there exists a need for a method to calculate the AAR of packets in a data stream in ATM-based networks in such a way that the quantization error described above is either reduced or eliminated. Removing this error allows the IAD clock 202 to be in constant and accurate synchronization with the network clock 112, eliminating subsequent data loss and padding. Long communication sessions for data sensitive analog faxes or modems in ATM-based networks can thereby occur without the use of direct synchronization or dual frequency clock methods.

SUMMARY OF THE INVENTION

The present invention is a method of providing improved accuracy in calculating the long-term average arrival rate (AAR) of an ATM packet stream. Using this method greatly reduces or completely eliminates the quantization error typically associated with these calculations. The frequency of the IAD clock 202 can be periodically adjusted to provide an improved level of accuracy and synchronization with the network clock 112 (FIG. 2).

The present invention takes an inverse approach to the prior art methods of calculating the AAR of an ATM packet stream. Whereas prior art methods measure the variable number of data packets that arrive during a known and fixed time interval, the present invention measures a variable time interval required to complete the arrival of a known and fixed number of packets.

The method defines a measurement session that consists of a predetermined and relatively large number of data packets, C. The measurement of the time interval begins and is synchronized with the arrival of the first packet $N_1$ in the session. Upon the arrival of packet $N_1$, a timer is triggered to begin the time interval measurement. The measurement continues until, and is in synchronization with, the complete arrival of the last packet, $N_c$, in the measurement session. Time intervals can be accurately measured to very precise values and the number of samples in a measurement session is known and constant. Thus, the AAR is calculated as $AAR=(C*S)/T$, where S is the number of samples per data packet.

Because the time interval measurement is triggered precisely by the arrival of the first data packet in the session, there is no quantization error with respect to the first packet. Likewise, because the end of the time interval measurement is triggered by the complete arrival of the last data packet in the session, there is no quantization error with respect to the last packet. Because no partial packets are counted in the session, the AAR calculation is free from the quantization error that characterizes prior art methods of AAR calculation.

DETAILED DESCRIPTION OF THE INVENTION

As discussed above in reference to FIG. 2, the IAD 200 receives data from the Public Telephone Switching Network (PSTN) 110 by way of the communications hub 120. The hub codec 122 digitizes analog signals from the PSTN 110 at a sample rate set by the network clock 112 and sends the digitized data to the multiplexer/packetizer 106. The multiplexer/packetizer 106 generates and transports a packet stream to the IAD 200 over the asynchronous transport service 130.

Figure 4:
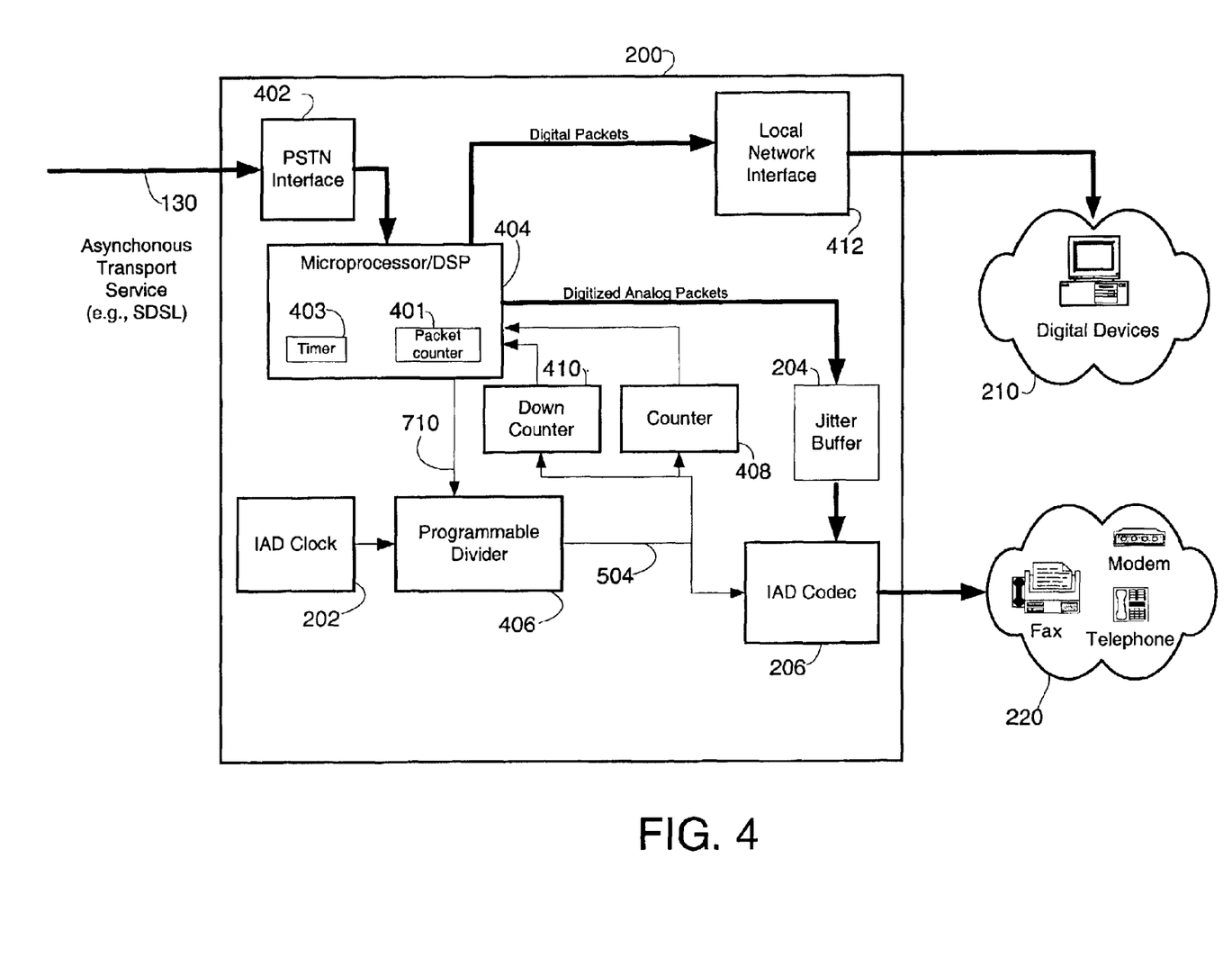
FIG. 4 is a detailed diagram of the IAD according to the present invention.

Referring now to FIG. 4, the IAD 200 of FIG. 2 is shown in greater detail and incorporating the principles of the present invention. The IAD 200 includes a PSTN interface 402, through which the data packet stream enters the IAD 200, and a microprocessor/DSP 404. The microprocessor/DSP 404 consists of one or more microprocessors and/or digital signal processors. The microprocessor/DSP 404 also includes a packet counter 401 and a timer 403. The microprocessor/DSP 404 performs multiple roles, such as separating digitized analog packets from digital data packets, performing signal processing and controlling the sampling clock. The IAD 200 further includes a programmable divider 406, a counter 408 and a downcounter 410. As discussed above with respect to FIG. 2, the IAD 200 also contains the IAD clock 202, which operates at a fixed frequency in the preferred embodiment, and the IAD codec 206.

Data packets arrive at the PSTN interface 402 over the asynchronous transport service 130. The data packets are then sent to the microprocessor/DSP 404 for separation of the digitized analog packets from the digital data packets. The digital data packets are sent to a local network interface 412 for distribution to the digital devices 210. The digitized analog packets are sent to the jitter buffer 204, where they are stored until clocked out by the IAD codec 206 as discussed above with respect to FIG. 2. After processing by the IAD codec 206, the data is sent to the analog devices 220.

The IAD codec 206 samples data out of the jitter buffer 204 at a rate determined by clock pulses output from the programmable divider 406. The programmable divider 406 divides down the clock pulses from the IAD clock 202 in order to adjust the sample rate of the IAD codec 206 to a desired rate. As discussed above, this rate is critical for the proper synchronization of the IAD codec 206 with the hub codec 122 (FIG. 2) to avoid data loss or padding.

Figure 5:
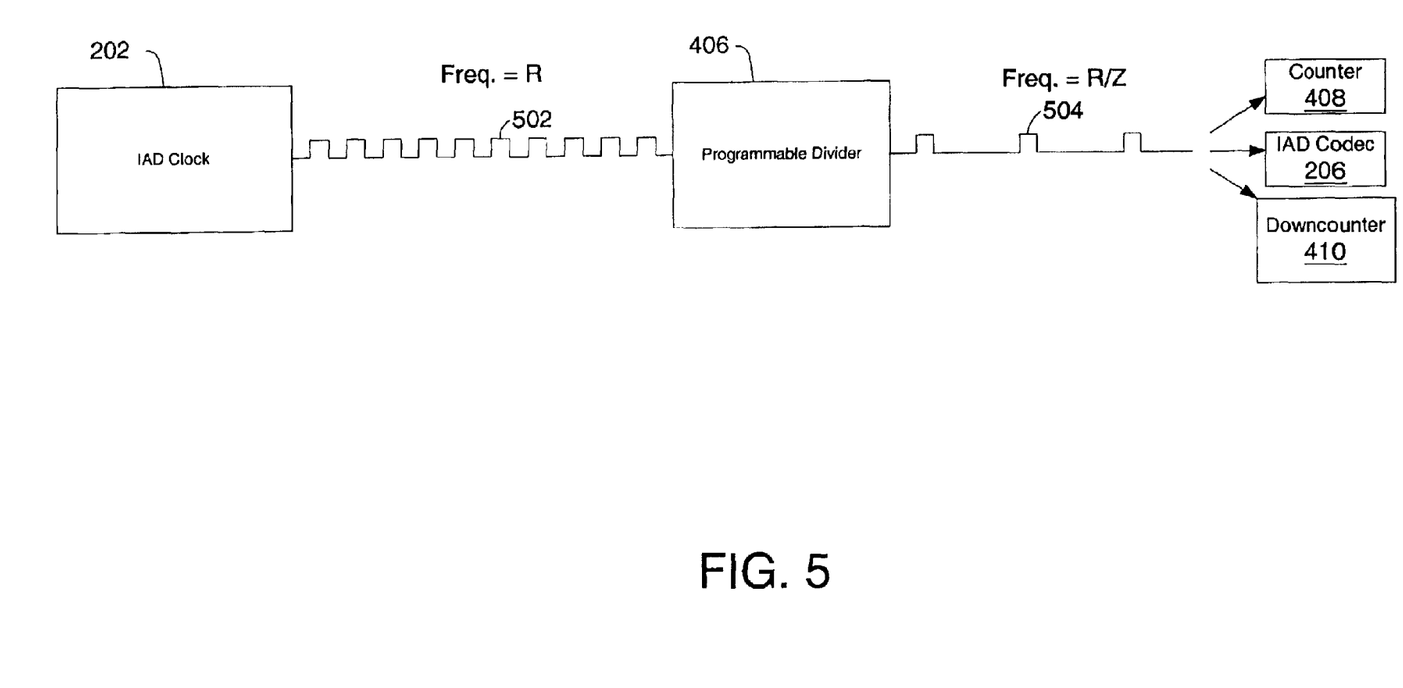
FIG. 5 is a schematic diagram of the interaction of an IAD clock with a programmable divider.

The operation of the programmable divider 406 and the IAD clock 202 are shown in FIG. 5. As can be seen, the IAD clock 202 outputs as series of IAD clock pulses 502 at a frequency R. The IAD clock pulses 502 are input to the programmable divider 406. The programmable divider 406 counts an integer number Z of IAD clock pulses 502. For every set of Z clock pulses 502 counted, the programmable divider 406 outputs one sampling pulse 504. As a steady stream of IAD clock pulses 502 are counted, the programmable divider 406 outputs a steady stream of sampling pulses 504 that are therefore output at a frequency of R/Z. The programmable divider 406 transmits the sampling pulses 504 at the divided down frequency to the IAD codec 206, the counter 408 and the downcounter 410. The function of each of these components is described below.

Referring back to FIG. 4, the IAD codec 206 uses the output from the programmable divider 406 to trigger sampling of incoming data packets. Thus, the IAD codec 206 clocks data out of the jitter buffer 204 at a rate equal to the frequency R/Z of the sampling pulses 504. As discussed above, problems will occur when the IAD codec 206 is not synchronized with the hub codec 122 (FIG. 2). Therefore, the value of Z must be chosen such that the programmable divider 406 outputs sampling pulses 504 at a frequency that matches the frequency of the network clock 112 (FIG. 1). Since the frequency of the network clock 112 is not known at the IAD 200, the invention calculates the long-term average arrival rate (AAR) of the data packets arriving at the IAD 200 to estimate the sampling rate of the network clock 112 and selects the value of Z accordingly.

The calculation of AAR is conducted over a measurement session. A measurement session consists of a predetermined and relatively large number of data packets, C, and the measurement of the time interval required for the complete arrival of C data packets. As can be seen in FIG. 4, the microprocessor/DSP 404 includes a packet counter 401 and a timer 403. The measurement of the time interval begins and is synchronized with the arrival of the first packet $N_1$ in the session. Upon the arrival of packet $N_1$, the timer 403 is triggered to begin the time interval measurement. The measurement continues until, and is in synchronization with, the complete arrival of the last packet, $N_c$, in the measurement session. Time intervals can be accurately measured to very precise values and the number of samples counted by the packet counter 401 in a measurement session is known and constant. The AAR is then calculated as AAR=(C*S)/T, where S is the number of samples per data packet. Because the time interval measurement is triggered precisely by the arrival of the first data packet in the session, there is no quantization error with respect to the first packet. Likewise, because the end of the time interval measurement is triggered by the complete arrival of the last data packet in the session, there is no quantization error with respect to the last packet. Because no partial packets are counted in the session, the AAR calculation is free from the quantization error that characterizes prior art methods of AAR calculation.

Figure 6:
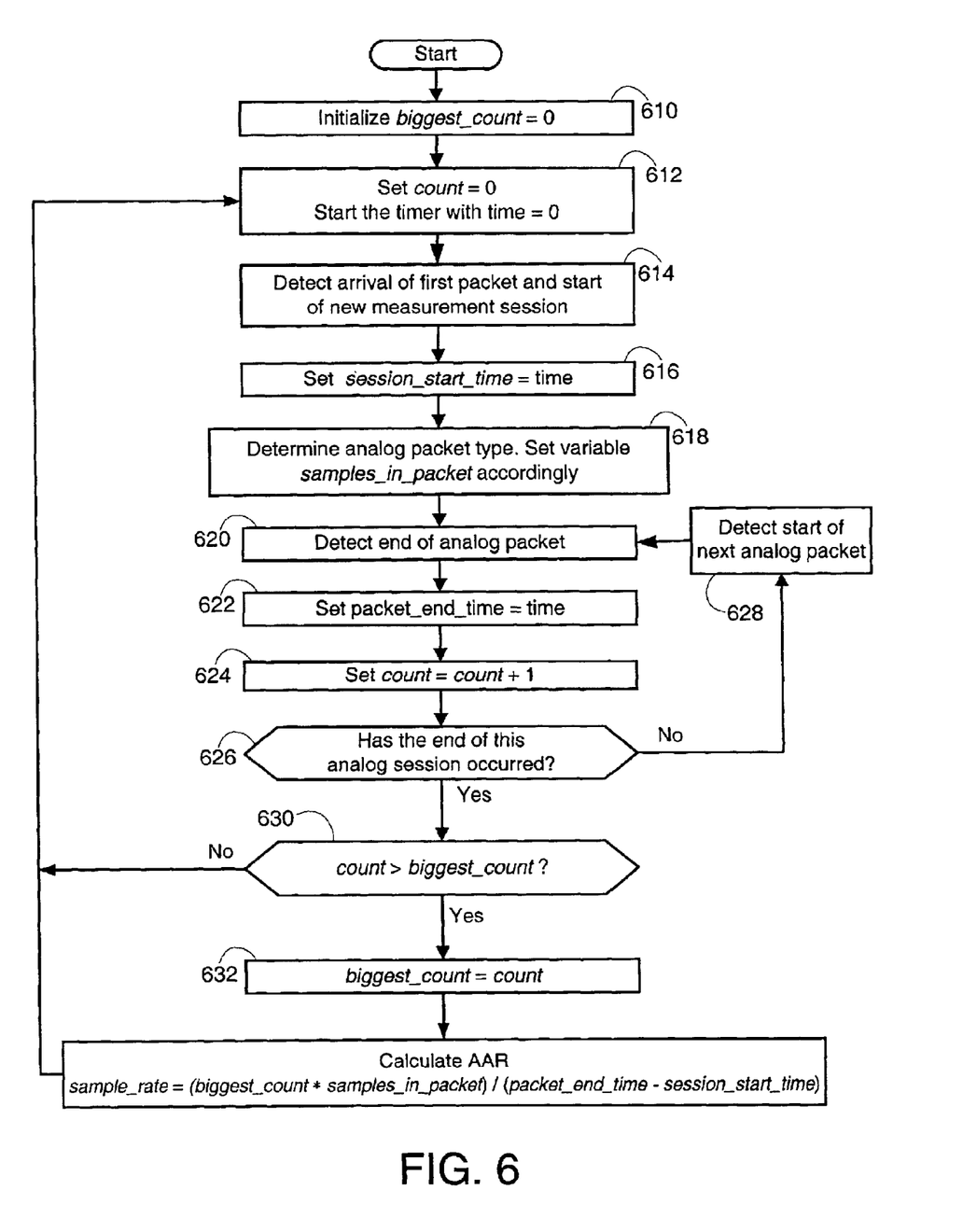
FIG. 6 is a flowchart illustrating steps to determine a long-term average arrival rate.

FIG. 6 shows a flowchart of a method of calculating the AAR according to the present invention. After startup or reboot of the system, an initialization step 610 sets a variable biggest_count to a startup default, such as zero. The variable biggest_count will contain a number corresponding to largest number of packets per session observed by the packet counter 401 thus far.

In Step 612, a count variable count for each measurement session is set to zero, and the timer 403 is set to zero. Step 614 waits for and detects the first packet in the measurement session to arrive. Upon the arrival of the first packet, Step 616 sets a variable session_start_time equal to a variable time corresponding to the start time of the session. Then, the type of analog packet received is determined at step 618. A variable samples_in_packet for the type of packets being received is correctly set.

A loop consisting of steps 620 through 628 counts the number of packets in the session. In Step 620, the end of the first packet is detected. Step 622 saves a variable packet_end_time to the value of the variable time. Step 624 increments the variable count by 1, representing the number of packets counted during the measurement session.

In Step 626, the variable count is compared to the number of packets C to be counted in the measurement session. If Step 626 determines that count is less than C, then the measurement session has not ended. In this case, Step 626 loops back to Step 628, which waits for and detects the start of the next packet.

Otherwise, if count equals C, then the measurement session has ended. In this case, Step 630 determines whether or not the variable count for this measurement session is the largest seen so far by comparing the variable count with the variable biggest_count. If the variable count is less than biggest_count, then Step 630 loops back to step 612 to wait for the next measurement session. If the variable count is greater than biggest count, then biggest_count is set to the value of count. The AAR is then calculated and stored as variable sample_rate. The method then returns to step 612.

The accuracy of the AAR calculation will be proportional to the number of packets included in the measurement session. Consequently, the method described in FIG. 6 uses the AAR calculation from the session containing the largest number of packets (e.g., a long phone call or modem session). Other statistical treatments can be used, such as an average sample clock rate of a number of different sessions or a time-weighted average of previous samples.

Once the AAR has been calculated as described above, the AAR is compared with the frequency of the sampling pulses 504 output from the programmable divider 406. Referring back to FIG. 4, the IAD 200 includes a counter 408. The counter 408 counts an integer P sampling pulses 504 from the programmable divider 406 (FIG. 5) and calculates the frequency of the sampling pulses 504 output from programmable divider 406. The counter 408 feeds this value to the microprocessor/DSP 404. This value is then compared to the calculated AAR. If there is a frequency difference, then the microprocessor/DSP 404 will either speed up or slow down the sampling rate output from the programmable divider 406 by a factor of Z, discussed in reference to FIG. 5.

Figure 7:
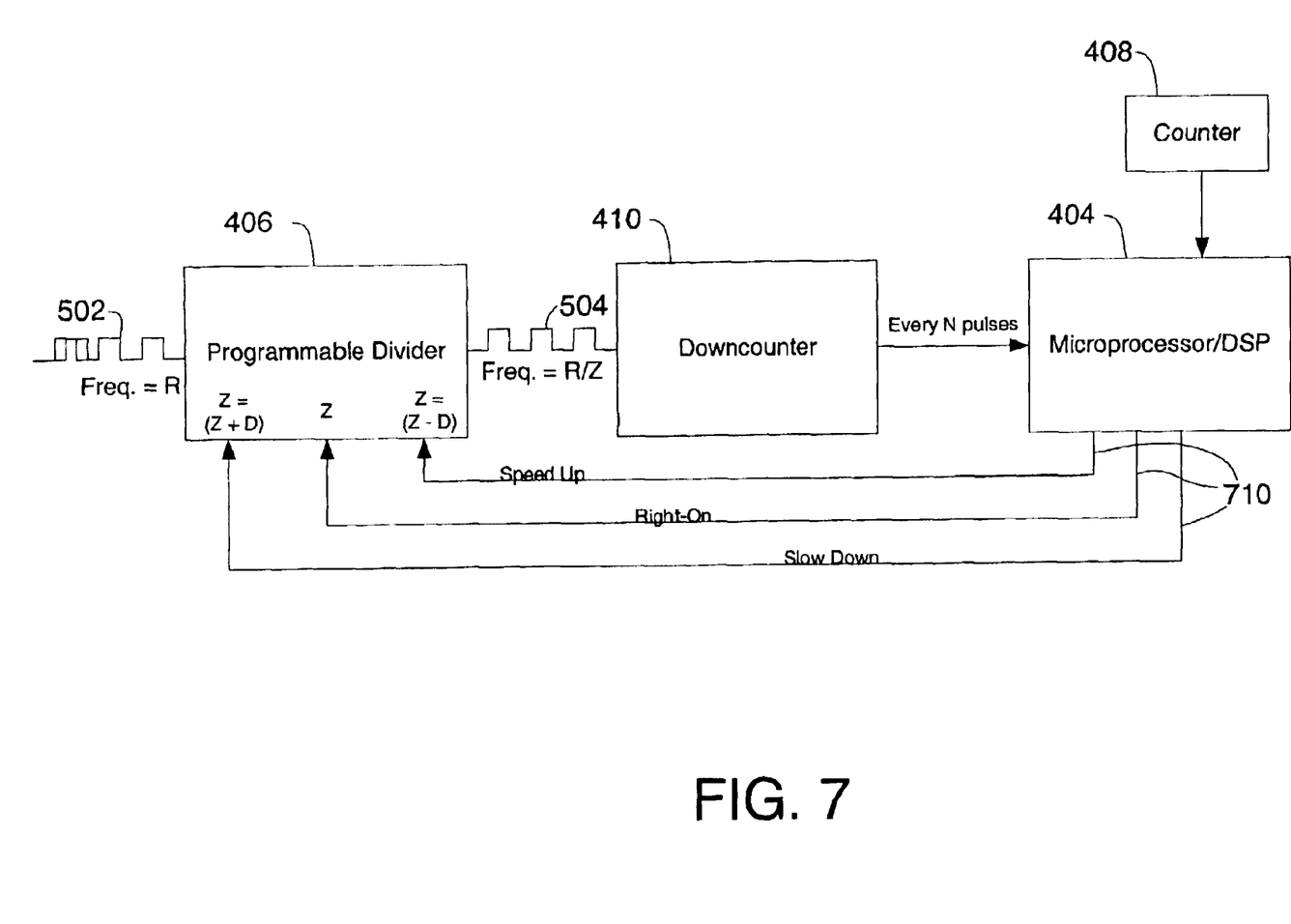
FIG. 7 is a schematic diagram illustrating how a microprocessor utilizes the long-term average arrival rate to adjust clock rates.

FIG. 7 shows a block diagram of how the microprocessor/DSP 404 controls the sampling rate output from the programmable divider 406. As can be seen, the downcounter 410 accepts sampling pulses 504 output from the programmable divider 406. The downcounter 410 counts a predetermined integer N of sampling pulses 504, the value of N being determined by the microprocessor/DSP 406. Upon completion of N pulse counts, the microprocessor/DSP 404 compares the frequency count from counter 408 to the AAR, which is calculated as discussed above with reference to FIG. 6. This comparison will yield one of three findings: (1) the frequency of the sampling pulses 504 is equal to the AAR; (2) the frequency of the sampling pulses 504 is faster than the AAR; or (3) the frequency of the sampling pulses 504 is slower than the AAR. In response, the microprocessor/DSP 404 sends one of three command signals to the programmable divider 406 over a feedback line 710: Right-On, Slow-Down or Speed-Up, respectively.

As discussed above with respect to FIG. 5, the programmable divider 406 outputs sampling pulses 504 at a frequency of R/Z, where R is the frequency of the IAD clock pulses 502. If the microprocessor/DSP 404 determines that the frequency of the sampling pulses 504 are equal to the AAR, it sends a Right-On command signal over feedback line 710. In this case, the programmable divider 406 is commanded to continue to divide frequency R by Z.

If the microprocessor/DSP 404 determines that the frequency of the sampling pulses 504 is faster than the AAR frequency, it sends a Slow-Down command signal over feedback line 710. In this case, the programmable divider 406 is commanded to divide frequency R by (Z−D), where D is a small integer, such as 1.

If the microprocessor/DSP 404 determines that the frequency of the sampling pulses 504 is slower than the AAR, it sends a Speed-Up command signal over feedback line 710. In this case, the programmable divider 406 is commanded to divide frequency R by (Z+D). Again, D is a small integer. In this way, the microprocessor/DSP 404 can continuously maintain, speed up or slow down the frequency of the sampling pulses 504 in order to match the frequency of the network clock 112 (FIG. 1).

In the preferred embodiment, Z is equal to 10 and D is equal to 1. Thus, a Right-On command from the microprocessor/DSP 404 will maintain the frequency of the sampling pulses 504 output from the programmable divider 406 at one-tenth of R (R/10). Similarly, a Slow-Down command will change the frequency of the sampling pulses 504 to one-eleventh of R (R/11) and a Speed-Up command will change the frequency to one-ninth of R (R/9).

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for measuring long-term arrival rates of data samples on an asynchronous transport network, the method comprising the steps of:
   counting a known and predetermined number of data samples in a session;
   measuring a time interval between the arrival of a first data sample and the arrival of a last data sample in said session; and
   calculating a long-term average arrival rate of said data samples by dividing said known and predetermined number of data samples by said measured time interval of said session.

2. The method of claim 1 wherein the data samples are contained within a plurality of data packets.

3. The method of claim 1 wherein said session is a session with the largest number of said data samples in a set of sessions.

4. A method for synchronizing a first clock rate of a network clock to a second clock rate of a receiver clock on an asynchronous transport network, the method comprising the steps of:
   counting a known and predetermined number of data samples in a session;
   measuring a time interval between the arrival of a first data sample and the arrival of a last data sample in said session;
   calculating a long-term average arrival rate of said data samples by dividing said known and predetermined number of data samples by said measured time interval of said session;

counting clock pulses output from said receiver clock to determine a value for said second clock rate;

calculating a clock rate error variable, said variable being equal to the difference between said calculated long-term average arrival rate and said second clock rate of said receiver clock; and adjusting said second clock rate of said receiver clock by an amount equal to said clock rate error variable.

5. The method of claim 4 wherein the data samples are contained within a plurality of data packets.

6. The method of claim 4 wherein said session is a session with the largest number of said data samples in a set of sessions.

7. The method of claim 4 wherein said long-term average arrival rate is an average rate of a number of different sessions.

8. The method of claim 4 wherein said long-term average arrival rate is a time-weighted average of previous sessions.

9. The method of claim 4 wherein the step of adjusting said second clock rate, having a frequency R, comprises dividing down said frequency R of said second clock rate by a factor Z, such that said adjusted second clock rate is R/Z.

10. A system for measuring long-term arrival rates of data samples on an asynchronous transport network, the system comprising:

means for counting a known and predetermined number of data samples in a session;

means for measuring a time interval between the arrival of a first data sample and the arrival of a last data sample in said session; and means for calculating a long-term average arrival rate of said data samples by dividing said known and predetermined number of data samples by said measured time interval of said session.

11. The system of claim 10 wherein the data samples are contained within a plurality of data packets.

12. The system of claim 10 wherein said session is a session with the largest number of said data samples in a set of sessions.

13. A system for synchronizing a first clock rate of a network clock to a second clock rate of a receiver clock on an asynchronous transport network, the system comprising:

means for counting a known and predetermined number of data samples in a session;

means for measuring a time interval between the arrival of a first data sample and the arrival of a last data sample in said session;

means for calculating a long-term average arrival rate of said data samples by dividing said known and predetermined number of data samples by said measured time interval of said session;

means for counting clock pulses output from said receiver clock to determine a value for said second clock rate;

means for calculating a clock rate error variable, said variable being equal to the difference between said calculated long-term average arrival rate and said second clock rate of said receiver clock; and means for adjusting said second clock rate of said receiver clock by an amount equal to said clock rate error variable.

14. The system of claim 13 wherein the data samples are contained within a plurality of data packets.

15. The system of claim 13 wherein said session is a session with the largest number of said data samples in a set of sessions.

16. The system of claim 13 wherein said long-term average arrival rate is an average rate of a number of different sessions.

17. The system of claim 13 wherein said long-term average arrival rate is a time-weighted average of previous sessions.

18. The system of claim 13 wherein the step of adjusting said second clock rate, having a frequency R, comprises dividing down said frequency R of said second clock rate by a factor Z, such that said adjusted second clock rate is R/Z.

19. A machine-readable medium having embodied thereon a program, said program being executable by an electronic device to perform method steps for measuring and calculating long-term arrival rates of data samples on an asynchronous transport network, the method steps comprising:

counting a known and predetermined number of data samples in a session;

measuring a time interval between the arrival of a first data sample and the arrival of a last data sample in said session; and calculating a long-term average arrival rate of said data samples by dividing said known and predetermined number of data samples by said measured time interval of said session.

20. The machine-readable medium of claim 19 wherein the data samples are contained within a plurality of data packets.

21. The machine-readable medium of claim 19 wherein said session is a session with the largest number of said data samples in a set of sessions.

22. A machine-readable medium having embodied thereon a program, said program being executable by an electronic device to perform method steps for synchronizing a first clock rate of a network clock to a second clock rate of a receiver clock on an asynchronous transport network, the method steps comprising:

counting a known and predetermined number of data samples in a session;

measuring a time interval between the arrival of a first data sample and the arrival of a last data sample in said session;

calculating a long-term average arrival rate of said data samples by dividing said known and predetermined number of data samples by said measured time interval of said session;

counting clock pulses output from said receiver clock to determine a value for said second clock rate;

calculating a clock rate error variable, said variable being equal to the difference between said calculated long-term average arrival rate and said second clock rate of said receiver clock; and adjusting said second clock rate of said receiver clock by an amount equal to said clock rate error variable.

23. The machine-readable medium of claim 22 wherein the data samples are contained within a plurality of data packets.

24. The machine-readable medium of claim 22 wherein said session is a session with the largest number of said data samples in a set of sessions.

25. The machine-readable medium of claim 22 wherein said long-term average arrival rate is an average rate of a number of different sessions.

26. The machine-readable medium of claim 22 wherein said long-term average arrival rate is a time-weighted average of previous sessions.

27. The machine-readable medium of claim 22 wherein the step of adjusting said second clock rate, having a frequency R, comprises dividing down said frequency R of said second clock rate by a factor Z, such that said adjusted second clock rate is R/Z.

* * * * *